United States Patent [19]
Goto et al.

[11] Patent Number: 5,130,728
[45] Date of Patent: Jul. 14, 1992

[54] INFORMATION RECORDABLE CAMERA

[75] Inventors: Tetsuro Goto, Funabashi; Kazuyuki Kazami, Tokyo, both of Japan

[73] Assignee: Nikon Corporation, Tokyo, Japan

[21] Appl. No.: 602,612

[22] Filed: Oct. 24, 1990

[30] Foreign Application Priority Data

Oct. 27, 1989 [JP] Japan ............................ 1-280226
Nov. 28, 1989 [JP] Japan ............................ 1-306621

[51] Int. Cl.$^5$ .................... G03B 1/12; G03B 17/24
[52] U.S. Cl. ............................. 354/105; 354/173.1
[58] Field of Search ............... 354/75, 76, 105, 106, 354/173.1, 173.11, 214

[56] References Cited

U.S. PATENT DOCUMENTS

4,574,692  3/1986  Wahli ............................. 101/2
4,878,075 10/1989  Cannon ........................ 354/173.1

*Primary Examiner*—Michael L. Gellner
*Attorney, Agent, or Firm*—Shapiro and Shapiro

[57] ABSTRACT

A camera capable of recording information and using a film having a magnetic recording medium, a film and a cartridge which accommodates the film, the camera comprising: a recording device for recording information about photography to the magnetic recording medium; a reproducing device for reproducing the information recorded in the magnetic recording medium; a determination device for subjecting the information recorded by the recording device and the predetermined information reproduced by the reproducing device to a comparison so as to output an alarm signal in a case where the two information items are substantially different from each other; and an alarm device for issuing an alarm to a user in response to the alarm signal transmitted from the determination device, wherein the recording device records the predetermined information in the magnetic recording medium while the reproduction device reproduces the predetermined information recorded in the magnetic recording medium.

22 Claims, 6 Drawing Sheets

INFORMATION RECORDABLE CAMERA

BACKGROUND OF THE INVENTION

1. Field of the Invention

The present invention relates to a camera which uses a film having a recording medium.

2. Related Background Art

Hitherto, there has been a cine camera arranged in such a manner that a magnetic medium is, as a magnetic track, formed in a photography film so as to be recorded/reproduced by a magnetic head provided in the camera.

Therefore, it might be considered feasible to employ a structure of a still camera arranged in such a manner that a magnetic medium is formed in the film so as to record a variety of information items about the photography to the magnetic medium. In the case where the magnetic recording medium is provided as described above, an advantage can be obtained in that a larger quantity of the various information items about the photography can be recorded in comparison to a conventional optical imaging method.

Figure 1:
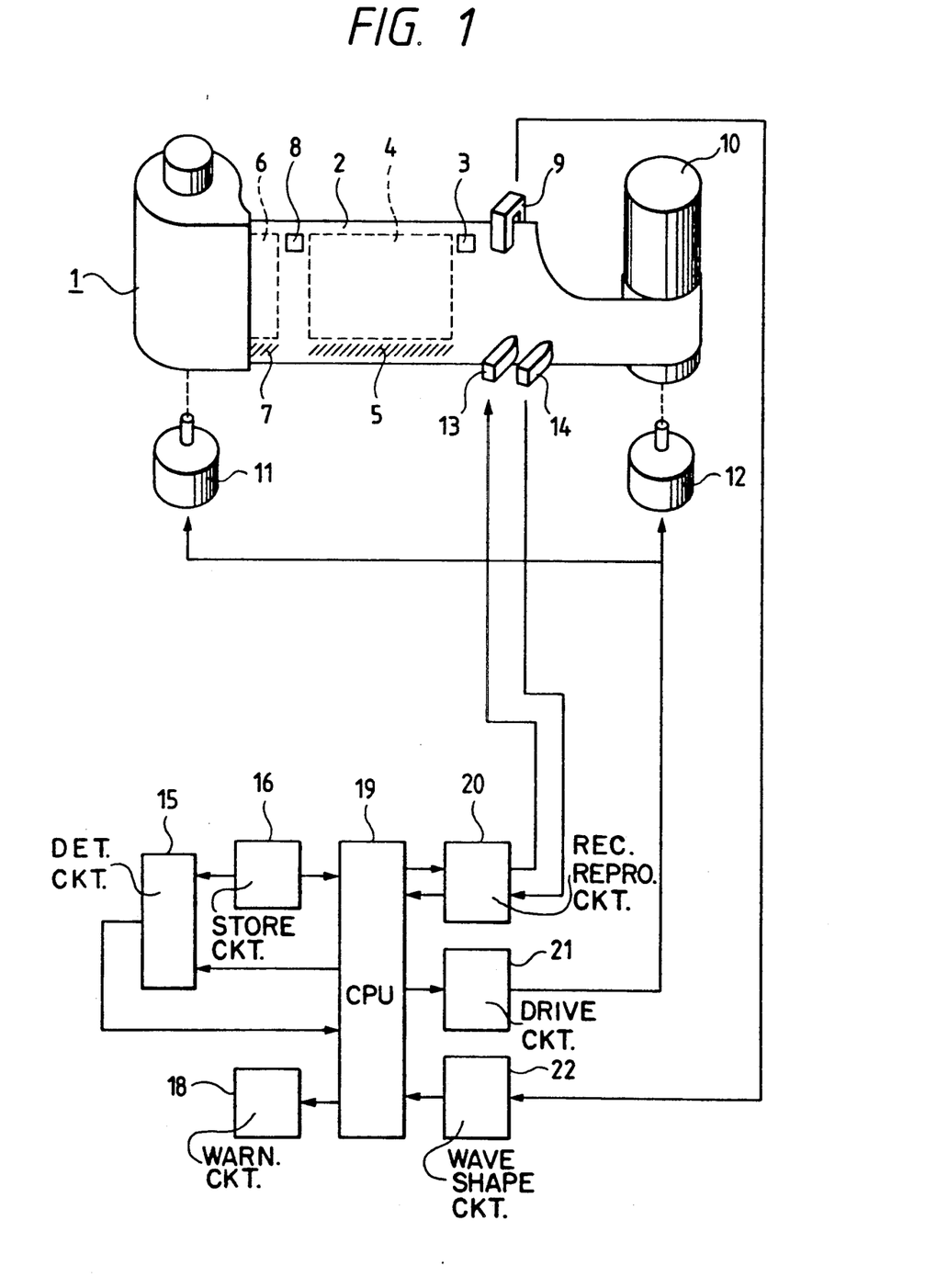
FIG. 1 is a schematic structural view which illustrates an embodiment of the present invention.

A film cartridge 1 shown in the upper portion of FIG. 1 is a film cartridge invented by the applicant of the present invention, the cartridge 1 accommodating a film 2.

There are frames (frames to be subject to photographies) 4 and 6, to which the image of a subject is photographed, on the surface of the film 2. Furthermore, magnetic tracks 5 and 7 are respectively formed below the frames 4 and 6.

The magnetic track 5 stores exclusive data about the frame 4, while the magnetic track 7 stores data about the frame 6. The other portion of the film 4 wound in the cartridge 1 are similarly arranged as for the relationship with the magnetic tracks.

When data is recorded/reproduced from the magnetic tracks 5 and 7 thus arranged, two magnetic heads 13 and 14 are provided for, for example, on the back cover of the cartridge 1 in such a manner that the two magnetic heads 13 and 14 confront the magnetic tracks 5 and 7.

In synchronization with feeding of the film 2, a signal is supplied to the recording head 13 so that information is recorded to the surface of the magnetic track 5, while information recorded in the magnetic track 5 can be reproduced by monitoring the output from the reproduction head 14.

A critical matter in the relationship between the magnetic tracks and the magnetic heads lies in that the magnetic head must equally positioned in contact with the magnetic track and that the surface of the magnetic head must be free from contamination or the like. If the above-described conditions are not satisfied, information cannot be correctly recorded and what is even worse it cannot be reproduced correctly. The degree of contact in which the magnetic head comes in contact with the magnetic track is finely affected by curling of the film.

In general, since there are a large quantity of dust of film due to cutting or contamination of the fingers of the user, it is very difficult of secure the reliability in the case where the information to be recorded is in the form of a digital signal.

SUMMARY OF THE INVENTION

An object of the present invention is to provide a camera capable of overcoming the problem in terms of the unsatisfactory reliability and being used easily.

Another object of the present invention is to provide a camera capable of erasing information incorrectly recorded in a recording medium at the time of the initial feeding of the film when the initial feeding operation has not been performed correctly.

In order to achieve the above-described objects, the present invention is arranged in such a manner that dummy data is recorded on the surface of a magnetic track at a certain time prior to photography, the dummy data thus recorded being then reproduced so as to be subjected to a relative comparison.

According to the present invention, dummy data which has been previously prepared is immediately reproduced after the photography. If the two data items do not coincide with each other, an alarm signal is issued to a user to notify a fact that the operation has been performed incorrectly or the operation of the camera is prohibited. Therefore, a problem of a type in which a user takes a picture of an image without recognizing the incorrect operation and first knows the incorrect operation can be overcome.

In order achieve the above-described objects, in the camera according to the present invention, when the operation of initially feeding a film has not been correctly performed, the contents incorrectly recorded on the recording medium at the time of the above-described initial feeding operation is erased. Therefore, even if the film has ever been incorrectly initially fed, the recording medium provided for the film is set to the non-record state. Therefore, information can normally be recorded to the recording medium of the film.

Other and further objects, features and advantages of the invention will be appear more fully from the following description.

DESCRIPTION OF THE PREFERRED EMBODIMENTS

A preferred embodiment of the present invention will now be described with reference to FIG. 1.

A film cartridge 1 accommodates a film 2 comprising frames 4 and 6 which have corresponding magnetic tracks 5 and 7.

The frames 4 and 6 are provided with, in the upper portion thereof, respective perforations 3 and 8 which act to position the imaging frame with respect to the position of an aperture (omitted from illustration).

The position of the film 2 to be fed is determined in accordance with a result of an observation operation in which a photo-coupler 9 observes perforations 3 and 8, the photo-coupler 9 being disposed in such a manner that it holds the upper edge of the film 2.

Two magnetic heads, that is, a recording head 13 and a reproducing head 14 are allowed to confront the film 2 from the back cover so as to be brought into contact with magnetic tracks 5 and 7 of the film 2.

The film 2 is wound up by a winding-up motor 12 connected to the lower portion of a spool, while the same is rewound by a rewinding motor 11 connected to the lower portion of the film cartridge 1.

FIG. 1 shows a state in which the film cartridge 1 thus arranged has been loaded to a camera (omitted from illustration) and the leading portion of the film 2 has wound around the spool 10.

The lower portion of FIG. 1 illustrates a block diagram of an electric circuit included in the camera.

A CPU 19 is provided so as to serve as central control means which transmits an output which causes a recording/reproducing circuit 20 to operate the recording head 13. As a result, information is recording to the magnetic tracks 5 and 7. Furthermore, the CPU 19 causes a driver circuit 21 to rotate the winding-up motor 12 or the rewinding motor 11 so that the film 2 is wound-up (fed to the right direction of the drawing) or rewound (fed to the left direction of the drawing). In addition, the CPU 19 causes a warning circuit 18 to perform a warning operation.

The CPU 19 receives magnetic information supplied from the magnetic tracks 5 and 7 via the recording/reproducing circuit 20, the magnetic information being reproduced by the reproducing head 14. Furthermore, the CPU 19 receives a perforation signal supplied from the photo-coupler 9 via a waveform shaping circuit 22 and a determination signal supplied from a determination circuit 15.

A data signal supplied from confirmation data storage circuit 16 is supplied to both the CPU 19 and the determination circuit 15.

Furthermore, information supplied from the magnetic tracks 5 and 7 and read by the CPU 19 is also supplied to the determination circuit 15.

Figure 2:
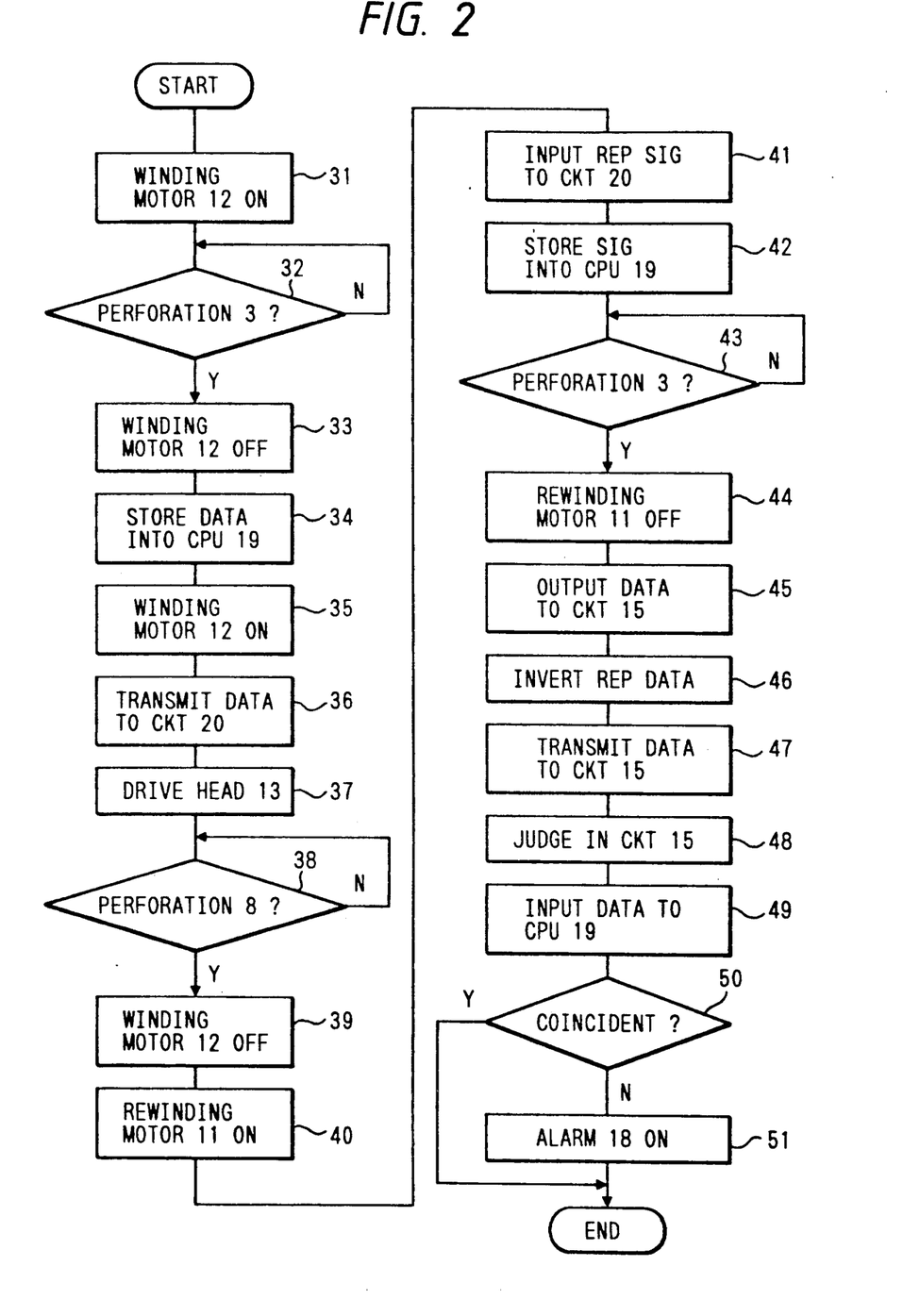
FIG. 2 is a flow chart of the above-described embodiment.

FIG. 2 illustrates an operation routine of the CPU 19 shown in FIG. 1.

This routine is a routine of an operation which starts in response to the power supply to the included circuit after the film cartridge 1 has been loaded into the camera.

It is assumed that the state of the film 2 is as shown in FIG. 1.

In step 31, a control signal is supplied to a driver 21 so that the winding-up motor 12 is rotated. As a result, the spool 10 is rotated so as to commence winding the film 2.

In step 32, it is determined whether or not the photo-coupler 9 has detected the first perforation 3 via the waveform shaping circuit 22. If it has been detected that the perforation has reached the position corresponding to the photo-coupler 9, the flow advances to step 33.

In step 33, the winding-up motor 12 is stopped. As a result, the initial setting of the film 2, that is, the proper setting of the first frame 4 of the film 2 to the position to which an image of a subject is projected (the aperture of the camera), is completed.

In step 34, the confirmation data stored in the data storage circuit 16 is transmitted to the CPU 19 so as to be stored in the inner memory of the CPU 19.

In step 35, the winding motor 12 is again rotated.

Simultaneously, the confirmation data, which has been stored, is transferred to the recording/reproducing circuit 20 in step 36. At this time, the magnetic track 5 on the film 2 has substantially reached a position corresponding to the recording head 13. Therefore, when the recording circuit 20 operates the recording head 13 in accordance with the confirmation data, the confirmation data is recorded on the magnetic track 5.

In step 38, the photo-coupler 9 monitors whether or not the perforation 8 of the next frame has reached.

When the perforation 8 has reached the photo-coupler 9, the flow advances to step 39 in which the winding-up motor 12 is stopped.

Thus, the confirmation data is recorded to the magnetic track.

In step 40, the rewinding motor 11 is rotated so that the film 2 is fed backwardly for the purpose of making the film 2 to be accommodated in the film cartridge 1. As a result of the above-described operation, the magnetic track 5 of the film 2 reaches the reproducing head 14 so that information recorded on the magnetic track 5 is converted into an electric signal by the reproducing head 14.

In step 41, the thus formed reproduction signal is supplied to the recording/reproducing circuit 20. In step 42, the reproduction signal thus supplied to the recording/reproducing circuit 20 is transferred to the CPU 19 so as to be stored by the inner memory means of the CPU 19.

As a result, the confirmation data recorded in step 37 is again reproduced.

In step 43, it is confirmed whether or not the perforation 3 has reached the position corresponding to the photo-coupler 9.

When the film 2 has returned to the initial position, the flow advances to step 44 in which the rotation of the rewinding motor 11 is stopped.

As a result, the initial setting of the film 2, that is, the film 2 has been returned to the initial position in step 32.

In step 45, a data signal of the confirmation data storage circuit 16 is transmitted to the determination circuit 15. The above-described data signal is the same as that transferred to the CPU 19 in step 34.

Since the order of the data signal reproduced/stored in step 42 has been inverted since the film 2 has been fed backwardly, the data signal in the CPU 19 is inverted in step 46.

In step 47, the reproduction signal of the correct order and supplied to the CPU 19 from the reproducing head 14 in step 19 is transferred to the determination circuit 15.

As a result, the determination circuit 15 receives two kinds of data signals, that is, a signal prior to the recording operation and a signal reproduced after the recording.

In step 48, an operation signal is transmitted to the determination circuit 15 so that the determination operation is performed.

In step 49, the result of the determination made by the determination circuit 15 is supplied to the CPU 19.

In step 50, the result of the determination made by the determination circuit 15 is confirmed. If the results coincide with each other, the flow skips step 51 so that the above-described routine is ended.

The fact that the signal prior to the recording operation and the signal reproduced after the recording operation coincide with each other means that the operation of the recording/reproducing system including the recording head 13, the magnetic track 5 and the reproducing head 14 is in good order.

If the determination circuit 15 has determined that the two signals does not coincide with each other, the flow advances to step 51 in which the operation of the alarm circuit 18 is started so that the disorder of the recording/reproducing system is notified to a user by a display or a voice.

The confirmation signal recorded in step 37 is not subjected to a process of erasure in the above-described routine. However, the confirmation data can be automatically erased when novel photography data is recorded at an ordinary photography operation in which the first frame 4 is exposed to light before the film is wound up and fed.

As a modification to the above-described embodiment, it might be considered feasible to employ a structure arranged in such a manner that the recording confirmation operation is performed at the time of the ordinary photography operation. According to this modification, the structure is constituted in such a manner that step 34 shown in FIG. 2 is started after the film has been subjected to the photography process.

As a further modification to the above-described modification, another structure may be employed in which a magnetic track which exclusively serves as a confirmation track is provided in the vicinity of the leading portion of the film in front of the first frame 4. As a result, the confirmation operation is performed not only when the film cartridge is loaded but also when the film has been rewound after all of the frames of the film have been subjected to the photography process. According to this modification, the operation of winding the film is stopped before the film is perfectly rewound into the cartridge. Then, step 34 shown in FIG. 2 is started.

The data acting in the confirmation data storage circuit 16 must, of course, be constituted in such a manner that the determination can reliably be made by the determination circuit 15.

As an alternative to the structure in which the confirmation data is prepared previously, data recorded, when the first frame has been subjected to the photography process, is as it is reproduced. Since the data to be recorded is stored by the CPU 19, the comparison can be made relatively easily. As a result, the data can be confirmed whenever the photography process is performed.

As described above, according to the present invention, the confirmation of the operation of the recording/reproducing system in the camera is made prior to the photography operation of the camera, the recording/reproducing system including the recording head, the reproducing head, their operating circuits and the magnetic track of the film loaded to the camera. If there is a disorder, the warning circuit acts to cause the user to know the state of the camera. Furthermore, a problem arisen in that the disorder of the camera is first known at the time of developing the film or the like can be overcome.

Then, another embodiment of the present invention will be described.

Figure 3:
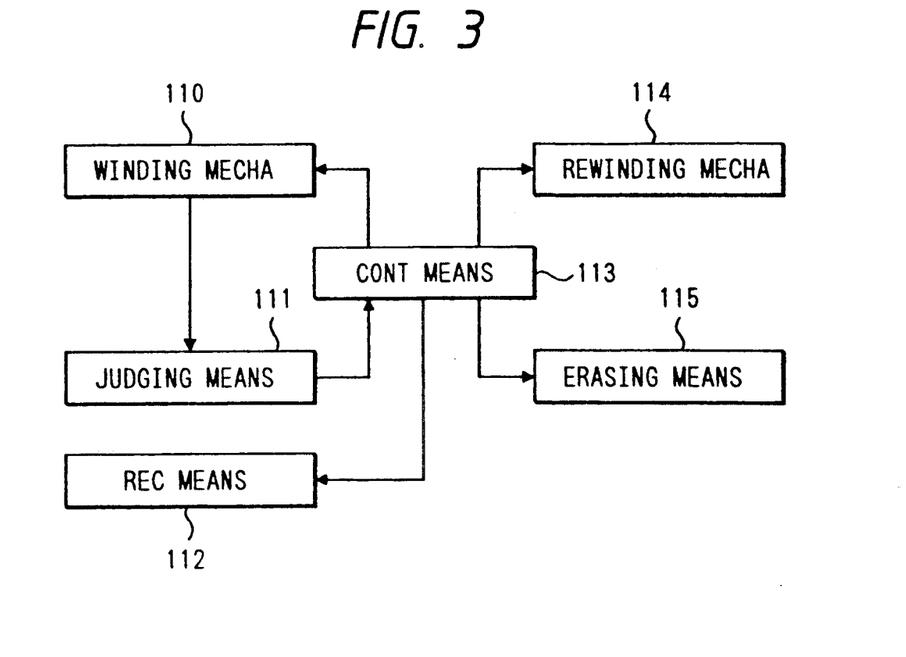
FIG. 3 illustrates a camera according to the present invention.

FIG. 3 is a schematic view which illustrates a camera capable of recording magnetic data thereto. Referring to FIG. 3, reference numeral 110 represents an initial feeding mechanism for initial-feeding the film. Reference numeral 114 represents a rewinding mechanism for rewinding the film and 112 represents recording means for recording information to a recording medium in synchronization with the initial feeding operation of the film. Reference numeral 115 represents a erasing means for erasing the contents recorded in the recording medium. Reference numeral 111 represents an operation determination means which transmits an operation error signal when the initial feeding operation has not been performed correctly. Reference numeral 113 represents a control means for causing the erasing means 115 to erase the contents recorded in the recording medium in the case where the operation error signal has been transmitted and the rewinding mechanism 114 has acted to rewind the film. The above-described initial feeding operation includes two types of operations. A first initial feeding operation corresponds to an operation for drawing the film by a predetermined number of frames from the cartridge. After the first initial feeding operation, the photography operation the film drawing operation by one frame are alternately performed. A second initial feeding operation corresponds to an operation for completely drawing out film from the cartridge. After the second initial feeding operation, the photography operation and the operation for rewinding the film by one frame are alternately performed.

Then, the operation according to this embodiment will be described. The control means 113 transmits a control signal to the initial feeding mechanism 110 and as well as it transmits a recording signal to the recording means 112 so as to control the recording operation. If the initial feeding operation has not been correctly performed by the initial feeding mechanism 110, the initial feeding operation error signal is supplied from the operation determination means 111 to the control means 113 and the control means 113 transmits the erasion signal to the erasing means 115 after the film has been wound by the rewinding mechanism 114. As a result, information recorded in the recording means by the recording means 112 is erased. Therefore, in the case where the initial feeding operation of the film has not been correctly performed, the incomplete contents recorded in the recording medium at the time of the above-described initial feeding operation is erased.

Then, the cameras capable of recording magnetic data thereto and according to the present invention will now be described with reference to the drawings.

Figure 4:
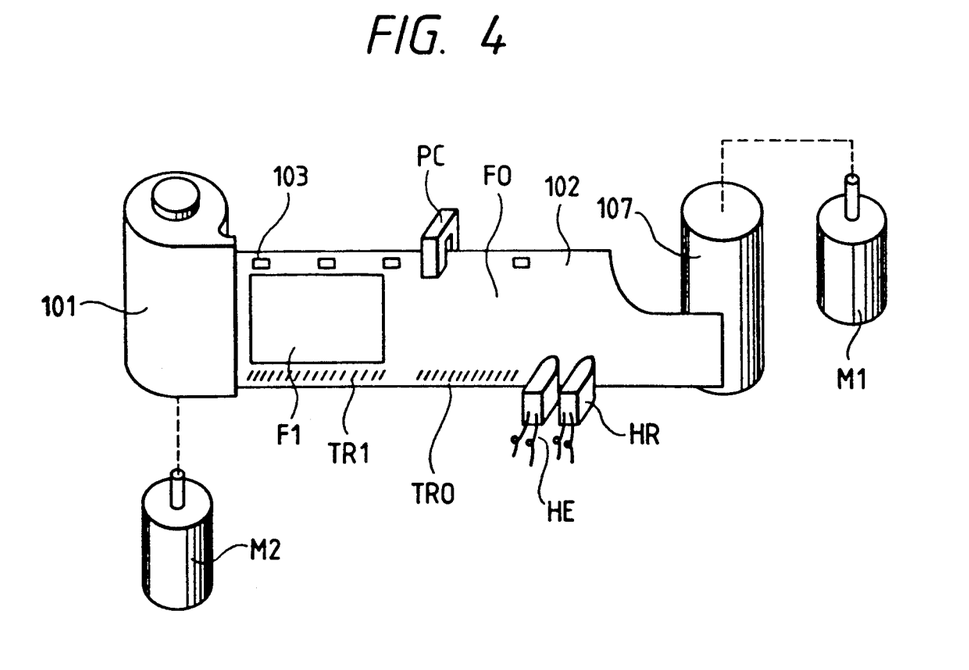
FIG. 4 is a structural view which illustrates an embodiment of the camera according to the present invention.

FIG. 4 is a structural view which illustrates an embodiment of a camera capable of recording magnetic data and according to the present invention. Referring to FIG. 4, a film 102 drawn out from patrone 101 has magnetic track TR1 in the lower portion of first frame F1 to which a subject is projected and recorded. Although omitted from illustration since contained in the patrone 1, magnetic tracks corresponding to the frames are provided in the lower portions of the frames from the second frame. The camera according to this embodiment comprises a back cover (omitted from illustration) having recording head HR for recording data to the magnetic track and erasing head HE for erasing data recorded on the magnetic track in such a manner that the two heads HR and HE are positioned in contact with the film 102. The operation of recording information on to the magnetic track TR1 will be described below. First, data to be recorded to the magnetic track TR1, which corresponds to the first frame F1, is recorded by the recording head HR during the movement of the film 102 after the first frame F1 has been subjected to the photography process. The magnetic tracks of the ensuing frames are similarly subjected to the recording process.

The film 102 shown in FIG. 4 comprises leading portion F0 having another magnetic track TR0 formed individually from the above-described magnetic tracks formed to correspond to each of the frames. The above-described magnetic track TR0 acts to record magnetic data when the film 102 is initially fed, the data to be thus recorded being different from the data which corresponds to each of the frames to be recorded in the magnetic track formed to correspond to each of the frames. The different data means total data which is common to all of the frames of the film, for example, the sensitivity of the film and the type of the camera. Therefore, the common data to all of the frames of the film can be obtained by reading the data recorded on the magnetic track TR0.

The photography operation by using the above-described film 102 will be described. When a release button (omitted from illustration) is depressed after the patrone 101 has been loaded to the camera, the film 102 is initially fed. That is, winding-up motor M1 rotates a spool 107 so that the film 102 the leading portion of which has been set to the spool 107 is wound up by a certain length. As a result, the first frame F1 is moved to the photography position (the position corresponding to the position of the aperture). Simultaneously, data relating to the state of the film 102 is recorded on the magnetic track TR0 by the recording head HR.

It is necessary for a user to manually set the leading portion of the film 102 to a predetermined position prior to the initial feeding operation of the film 102. If the above-described manual operation for setting the film 102 is performed incompletely, the initial feeding of the film 102 cannot be correctly performed. Therefore, a problem arises in that the film 102 has been incorrectly drawn out. The confirmation whether of not the above-described initial feeding operation has been correctly performed is made in accordance with a result of a determination whether or not the number of perforations 103 of the film 102 counted by a photo-coupler PC coincides with a predetermined value, the counting of the perforation 103 being performed during the initial feeding operation, that is, during the film 102 is being wound up by a predetermined time. If the initial feeding operation has incorrectly performed, the film 102 which has been drawn out incompletely is again rewound to the initial position. That is, the film 102 is rewound to the patrone 101 by rotating rewinding motor M2 after winding-up motor M1 has been stopped. The above-described mechanism is a known technology.

Since the recording head HR is being operated in response to the data signal during the initial-feeding rotation of the spool 107, the result of the determination whether or not the recording to the track TR0 has been correctly performed is detected at the time of the confirmation whether or not the initial feeding of the film 102 has been correctly performed. That is, in the case where the initial feeding operation has been performed incorrectly, the film 102 is, as described above, reset to the initial position. Therefore, the incorrect operation of recording data to the magnetic track TR0 is detected. However, a problem arises in that data which has been incorrectly recorded to the magnetic track TR0 is left as it is. In order to overcome the above-described problem, the data (information) recorded incorrectly must be erased.

Then, the schematic operation of a structure capable of overcoming the above-described problem will be described with reference to FIG. 4.

First, the description will be made about a case in which the initial feeding operation is performed correctly. The film 102 drawn out from the patrone 101 has been set to the spool 107 by a user so that it can be immediately initially fed. When an initial feeding sequence is started, the winding-up motor M1 is rotated so that the spool 107 is rotated. As a result, the film 102 is drawn out and is wound around the spool 107. Data determined to be necessary in accordance with a result of data reading (to be described later with reference to FIG. 6) performed prior to the above-description operate is recorded to the magnetic track TR0 via the recording head HR simultaneously with the initial feeding operation. If the initial feeding operation has been correctly performed, an exposure operation is performed when the shutter is released. As a result, the image of a subject is recorded on the first frame F1. Furthermore, data relating to that frame is magnetically recorded on to the magnetic track TR1 simultaneously with the following winding operation. Thus, recording of all of data items including the image recorded to the first frame F1 is completed. During the above-described operation, the photo-coupler PC acts to detect the perforation 103 when the film 102 is fed. However, the rewinding motor M2 and the erasing head HE are not operated.

Then, the description will be made about a case in which the initial feeding operation has not been correctly performed. If the photo coupler PC could not detect the perforation of the film 102, it is determined that the initial-feeding operation has not been performed correctly. As a result, the rotation of the winding motor M1 and the operation of the recording head HR are stopped.

Data recorded to the magnetic track TR0 during the above-described operation is not effective data since the film 102 has not been fed correctly.

The erasing head HE is operated simultaneously with the action of retracting the film 102 into the patrone 101 by rotating the rewinding motor M2. As a result, data which has been stored in the magnetic track TR0 is perfectly erased.

The rewinding motor M2 is stopped after an operation of detecting the film has been performed by a known film presence detection switch (omitted from illustration). The film presence detection switch is disposed on the opposite side to the recording head HR with respect to the film 102 when viewed in the drawing so as to detect the presence of the film 102.

According to the above-described embodiment, the rewinding operation is automatically performed after the initial feeding has been conducted incorrectly. However, another structure may, of course, be arranged in such a manner that a user instructs the rewinding operation by a predetermined operation after the user has recognized that the initial feeding operation has been performed incorrectly.

Figure 5:
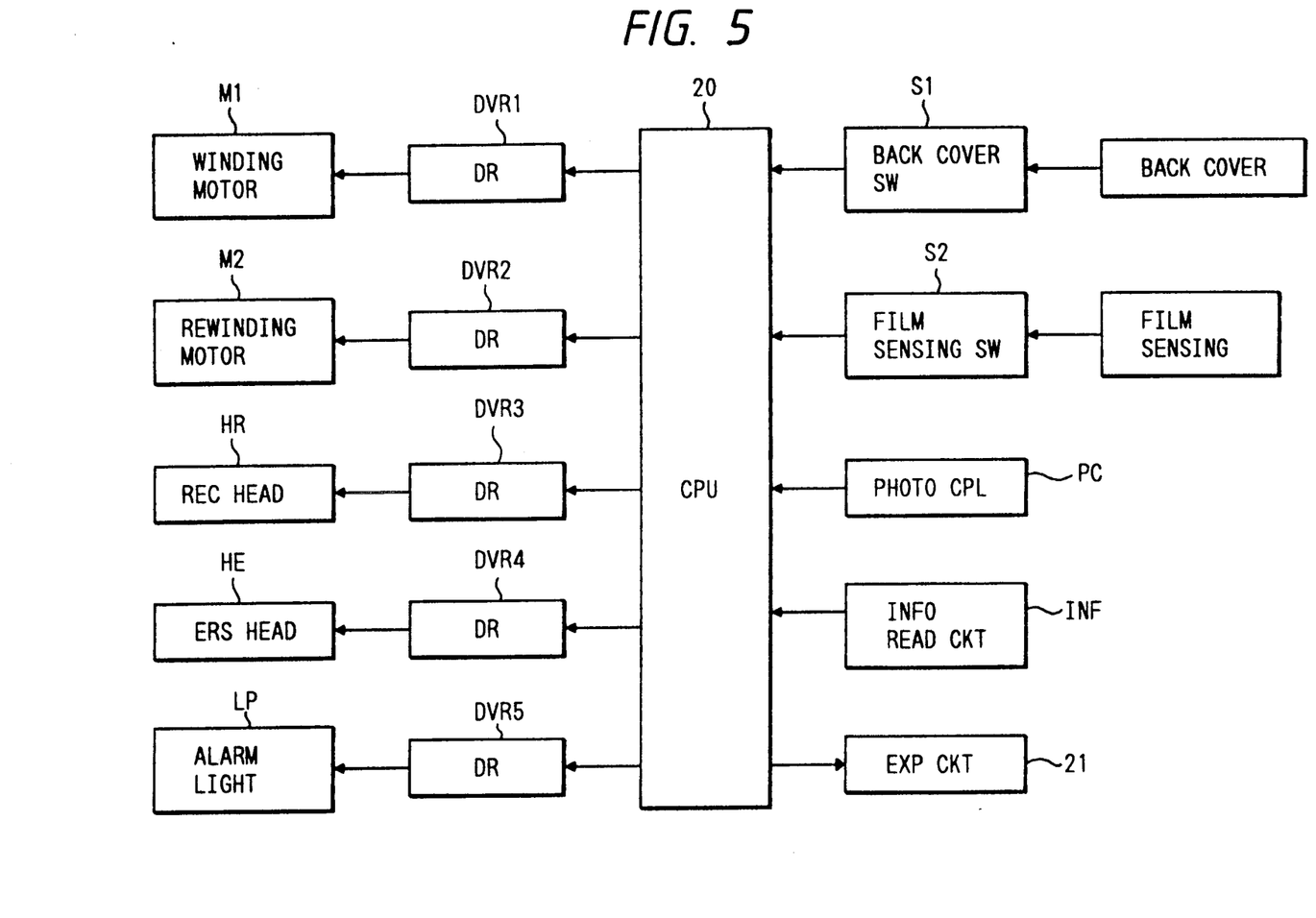
FIG. 5 is a block diagram according to the above-described embodiment.

FIG. 5 is a block diagram which illustrates a circuit included in the camera according to this embodiment. A CPU 120 is provided as a core means of the control means so as to control a variety of I/O signals and the operation of the control means. That is, the CPU 120 recognizes various input information supplied from an information read circuit INF which reads information number given to a back cover switch S1 for detecting the state of the back cover, a film presence detection switch S2 for detecting the state in which the film has been loaded, a photo-coupler PC for detecting the state in which the film has been fed and a patrone for accommodating the film and an information signal optionally set by a user. As a result of the recognition thus made, the CPU 120 determines a predetermined operation to be performed and information to be recorded. Then, the CPU 120 transmits control signals to drivers DVR 1 to DVR 5 for driving corresponding winding motor M1, the rewinding motor M2, the recording head HR, the erasing head HE and the warning lamp LP for alarming the incorrect initial feeding to a user of the camera. The control signal is also transmitted to a known exposure circuit 121.

Figure 6:
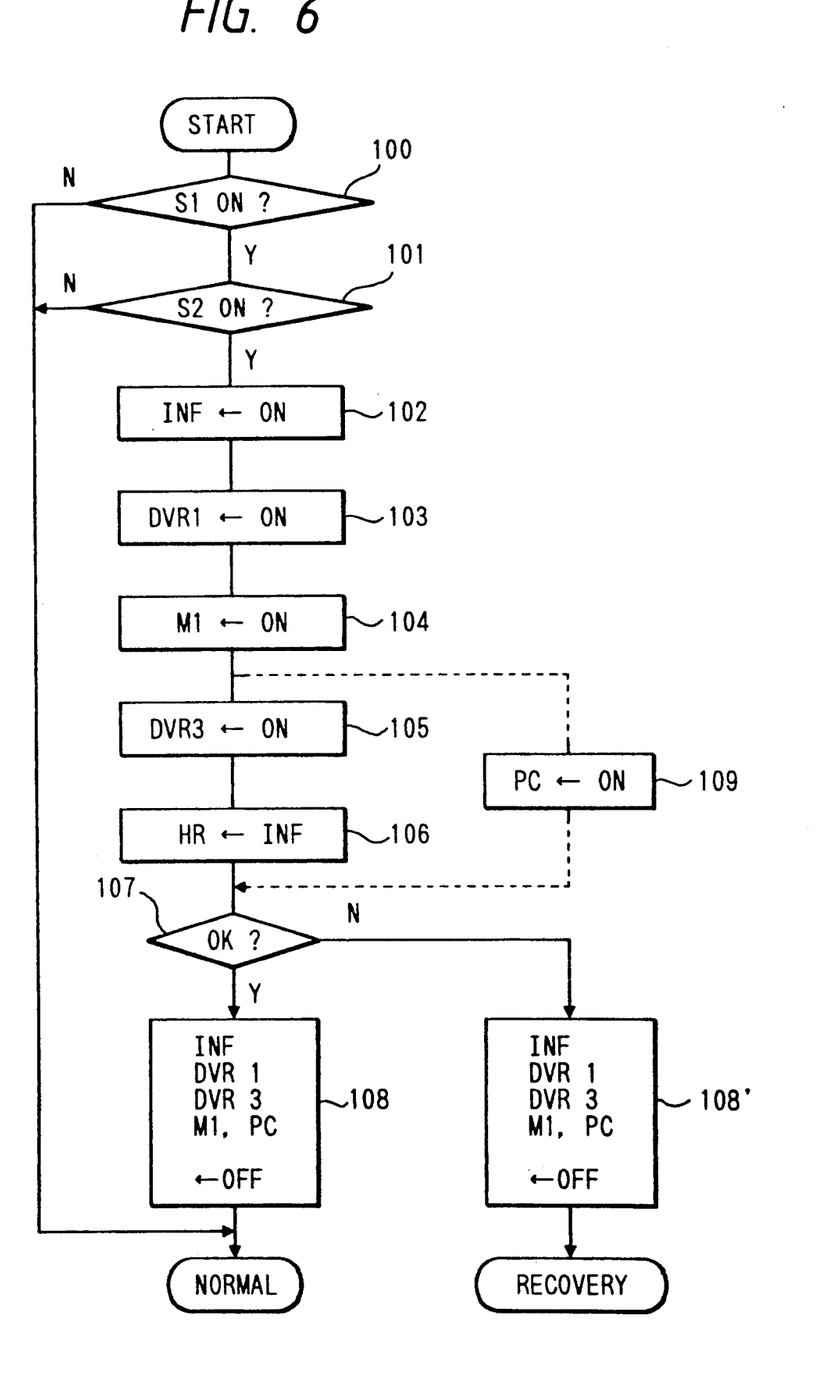
FIGS. 6 and 7 are flow charts which illustrates the operation.

FIG. 6 is a flow chart which illustrates the operation of the CPU 120 performed at the time of the initial feeding operation. That operation is started when a power source (omitted from illustration) is turned on by, for example, depressing a release button. First, whether or not the back cover of the camera is opened is determined in accordance with a fact whether or not the back cover switch S1 has been turned on (step 200). The back cover switch S1 is turned on when the back cover is closed, while the same is turned off when the back cover is opened. Then, whether or not the film has been loaded is determined in accordance with a fact whether or not the film presence switch S2 has been turned on (step 201). The film presence switch S2 is switched on in the case where the film has been set as shown in FIG. 4, while the same is switched off in the case where the film has not been set. If the result of the determination made in step 201 is "Y", information such as the sensitive signal of the loaded signal and information about the camera is read via the information detection circuit INF, the information relating to the film to be subjected to the photography process. The information thus read is temporarily stored in the CPU 120 (step 202). Then, an ON signal is transmitted to the driver DVR 1 (step 203) so that the rotation of the winding-up motor M1 is started, causing the initial feeding operation of the film to be started (step 204). Furthermore, an ON signal is transmitted to the driver DVR 3 (step 205). As a result, information read in step 202 is recorded to the magnetic track of the film by the recording head HR (step 206).

After the completion of step 204, the flow advances to step 205 and the same also advances to step 209 in which the operation of the photo-coupler PC is started so that the passage of the perforation of the film is detected. That is, the information recording operation in response to the initial feeding operation and the feed confirmation operation are simultaneously performed.

Then, whether or not the initial feeding operation has been correctly performed is determined in response to a detection signal supplied from the photo-coupler PC (step 207). If it has been determined to be "Y", that is, if the initial feeding operation has been correctly performed, the information detection circuit INF, the drivers DVR 1 and DVR 3, the winding up motor M1 and the photo-coupler PC are turned off and the shift to an ordinary photography routine is permitted (step 208). Since the photography routine is well known, its description is omitted here. If the result is "N", that is, if the initial feeding operation has not been performed correctly, the operation which is same as that in step 208 is performed (step 208) before the flow is shifted to a recovery routine to be described later.

Any of a variety of methods of determining whether or not the initial feeding has been performed correctly can be employed as an alternative to the above-described method in which the photo-coupler PC is used. The present invention is effective if recording of information is, to a certain degree, performed when it has been determined that the initial feeding had not been performed correctly, that is, if information is incorrectly recorded.

Figure 7:
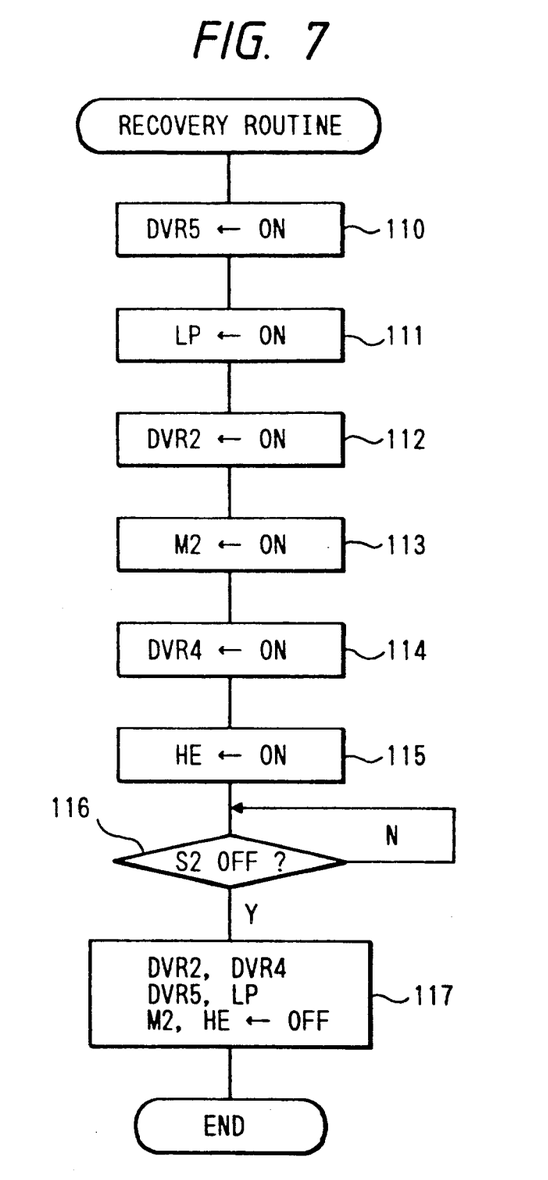

FIG. 7 is a flow chart which illustrates the operation of a recovery routine.

First, an ON signal is transmitted to the driver DVR 5 (step 210) so that the warning lamp LP is lit (step 211). The above-described operation is performed for the purpose of notifying a user a fact that the backup operation which is different from a usual operation has been started because the initial feeding operation had been incorrectly performed.

Then, the driver DVR 2 is turned on (step 212) so that the rotation of the rewinding motor M2 is started (step 213). As a result, the operation of rewinding the film, which has been incorrectly drawn out since the initial feeding has been performed incorrectly, into the patrone is started. Then, the driver DVR 4 is turned on (step 214) so that the erasing head HE is operated so that data recorded to the magnetic track in step 206 shown in FIG. 6 is completely erased (step 215). The above-described operation is continued until a determination is made that the film presence switch S2 is switched off (step 216). Then, drive signals for the drivers DVR 2, DVR 4 and DVR 5 are stopped so that the operation of each of the warning lamp LP, the rewinding motor M2 and the erasing head HE is stopped so that the recovery routine is ended (step 217).

Although the magnetic track is provided for the film as a recording medium for recording information according to the above-described embodiment, the present invention is not limited to the above-described description. For example, a proper recording medium, such as a semiconductor storage device such as a RAM may be provided for the patrone to which the film is loaded.

As described above, in the camera capable of recording information according to the present invention, when the operation of initially feeding a film has not been correctly performed, the contents incorrectly recorded on the recording medium at the time of the above-described initial feeding operation is erased. Therefore, even if the film has ever been incorrectly initially fed, the recording medium provided for the film is set to the non-record state. Therefore, information can normally be recorded to the recording medium of the film.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. A camera capable of recording information and using film means having a magnetic recording medium, a film and a cartridge which accommodates said film, said camera comprising:
    recording means for recording information with respect to photography on said magnetic recording medium;

reproducing means for reproducing said information recorded on said magnetic recording medium, said recording means recording predetermined information on said magnetic recording medium and said reproducing means reproducing said predetermined information recorded on said magnetic recording means;

determination means for comparing said information recorded with said recording means and said predetermined information reproduced by said reproducing means so as to output an alarm signal in a case where said two information items are substantially different from each other; and alarm means for alarming to a user in response to said alarm signal transmitted from said determination means.

2. A camera according to claim 1, wherein said predetermined information is dummy data.

3. A camera according to claim 1, wherein said predetermined information is recorded in response to loading of said film.

4. A camera according to claim 1, wherein said predetermined information is recorded after said film has been loaded and drawn out by a predetermined length but before photography.

5. A camera according to claim 1, wherein said predetermined information is recorded in response to a completion of a photography operation.

6. A camera according to claim 1, wherein said predetermined information is recorded after a predetermined number of frames have been photographed.

7. A camera according to claim 1, wherein the sequential order of a reproduction signal obtained by reproducing said predetermined information is reversed before said reproduction signal the sequential order of which has been inverted and a signal obtained at the time of recording said predetermined information are subjected to a comparison by said determination means.

8. A camera according to claim 7, wherein said magnetic recording medium is a recording track formed in the leading portion of said film.

9. A camera according to claim 8, wherein said recording track extends in the lengthwise direction of said film and disposed adjacent to a photography region of said film.

10. A camera according to claim 1 further comprising:

erasing means for erasing information recorded in said magnetic recording medium, wherein said erasing means erases said predetermined information in response to said alarm signal issued from said determination means.

11. A camera according to claim 1, wherein said magnetic recording medium has two magnetic recording portions so that said recording means records information about said photography and said predetermined information to said two magnetic recording portions respectively and said reproduction means reproduces, from said magnetic recording portion, said information about said photography and said predetermined information respectively.

12. A camera according to claim 1, wherein said predetermined information comprises information about a photography.

13. A camera using film means including a storage medium for storing information, a film and a cartridge which accommodates said film, said camera comprising:

means for drawing said film from said cartridge;

drawing means for rewinding said film to said cartridge;

storage means for causing information to be stored into said storage medium in synchronization with said rewinding operation;

erasing means for erasing information stored in said storage medium;

detection means for issuing an alarm signal if it detects a fact that the quantity of said film drawn out by said drawing means is less than a predetermined quantity; and control means for driving said erasing means so as to erase said information stored in said storage medium in response to a fact that said alarm signal has been transmitted and that said film rewinding operation has been performed by said rewinding means.

14. A camera according to claim 13, wherein said storage medium is formed on the surface of said film.

15. A camera according to claim 13, wherein said storage medium is formed on the surface of said cartridge.

16. A camera according to claim 13, wherein said storage medium is a magnetic recording portion and said storage means and said erasing means are magnetic heads.

17. A camera according to claim 13, wherein said detection means is an optical counter for detecting whether or not said film has been fed by a distance which exceeds a predetermined distance by counting the number of perforations formed in said film which has been fed.

18. A camera using film means including a storage medium for storing information, a film and a cartridge which accommodates said film, said camera comprising:

means for drawing said film from said cartridge;

rewinding means for rewinding said film to said cartridge;

storage means for causing information to be stored into said storage medium in synchronization with said drawing operation;

erasing means for erasing information stored in said storage medium;

detection means for issuing an alarm signal if it detects a fact that the quantity of said film drawn out by said drawing means is less than a predetermined quantity; and alarm means for issuing an alarm to a user in response to said alarm signal.

19. A camera according to claim 18, wherein said storage medium is formed on the surface of said film.

20. A camera according to claim 18, wherein said storage medium is formed on the surface of said cartridge.

21. A camera according to claim 18, wherein said storage medium is a magnetic recording portion and said storage means and said erasing means are magnetic heads.

22. A camera according to claim 18, wherein said detection means is an optical counter for detecting whether or not said film has been fed by a distance which exceeds a predetermined distance by counting the number of perforations formed in said film which has been fed.

* * * * *